US007973447B2

(12) United States Patent
Warner et al.

(10) Patent No.: US 7,973,447 B2
(45) Date of Patent: Jul. 5, 2011

(54) ELECTRIC MOTOR

(75) Inventors: Robin Warner, Torrington, CT (US); Siu Chun Tam, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 141 days.

(21) Appl. No.: 12/365,043

(22) Filed: Feb. 3, 2009

(65) Prior Publication Data

US 2009/0212656 A1 Aug. 27, 2009

Related U.S. Application Data

(60) Provisional application No. 61/026,015, filed on Feb. 4, 2008.

(51) Int. Cl.
*H02K 13/00* (2006.01)

(52) U.S. Cl. ........................................ 310/239; 310/245

(58) Field of Classification Search .................. 310/245, 310/239, 240, 242
See application file for complete search history.

(56) References Cited

U.S. PATENT DOCUMENTS 3,983,432 A 9/1976 Rankin
4,625,136 A 11/1986 Kipke
4,800,313 A * 1/1989 Warner et al. ................ 310/242
4,990,811 A * 2/1991 Nakata et al. ................ 310/239
4,994,701 A * 2/1991 Bulick ......................... 310/239
5,256,925 A 10/1993 Cutsforth
5,373,210 A 12/1994 Baer et al.
5,397,952 A * 3/1995 Decker et al. ................ 310/242
5,463,264 A 10/1995 Koenitzer
5,602,957 A 2/1997 Wille et al.
6,731,042 B1 5/2004 Bank et al.
2002/0125786 A1 9/2002 Chi

FOREIGN PATENT DOCUMENTS

DE 30 10 036 A1 10/1981

* cited by examiner

*Primary Examiner* — Nguyen N Hanh
(74) *Attorney, Agent, or Firm* — Birch, Stewart, Kolasch & Birch, LLP

(57) ABSTRACT

An electric motor 10 has a stator 14; a wound rotor 20, including a commutator 28; and brush gear for connecting the commutator to a source of electrical power. The brush gear has at least two cage brush assemblies 34. Each cage brush assembly 34 having a brush 40 for making sliding electrical contact with the commutator of the motor; a cage 50 for guiding the brush 40 along a path towards the commutator; and a spring 70 for resiliently urging the brush 40 along the path through the cage 50. The spring 70 is a constant force spring having two coiled end portions which engage the cage 50 at a commutator end portion. The cage 50 has two fingers about which the coiled end portions of the spring 70 locate.

15 Claims, 3 Drawing Sheets

ELECTRIC MOTOR

CROSS-REFERENCE TO RELATED APPLICATIONS

This non-provisional patent application claims priority under 35 U.S.C. §119(e) from Provisional Patent Application No. 61/026,015 filed in USA on Feb. 4, 2008.

BACKGROUND OF THE INVENTION

The present invention relates to an electric motor and in particular to a cage brush system for an electric motor having a constant force spring.

PRIOR ART

Electric motors having cage brushes are well known. Such motors include DC motors and universal motors. Cage brush systems use a cage in which the brush is slidably received for guiding the brush into contact with a commutator for the transfer of electrical power. The cage brush system comprises the cage, the brush and a spring for resiliently urging the brush out of the cage and into contact with the commutator. The spring allows for movement of the brush due to wear and to irregularities in the surface of the commutator. As the life of the brushes is a major factor in the life of the motor, it is desired to make the brushes as long as possible. This means that the spring has to be able to apply the required force to the brush while being expandable from a maximum compressed stage when the brush is new to a fully extended state when the brush is worn out (end of life). In the fully extended state the brush is still required to apply the required force to the brush to maintain the desired brush pressure on the commutator. Thus the fully extended state is a design state and not the relaxed state of the spring. This change in length of the spring while still supplying an acceptable force to the brush is difficult to achieve. Traditionally the spring is a coil spring and the length of the spring required to provide a generally constant force over to life of the brush means that the length of the brush is often limited due to the available space for the cage which contains both the brush and the spring in series. Torsion springs have been used successfully for brushes with a small length and as they are mounted outside of the cage, give good utilisation of the cage to maximise the length of the bush. However, it is not easy for end customers to change the brushes in torsion spring assemblies meaning that the motor life is often limited to one set of brushes. Also the range of movement of the torsion spring has some limitations.

A constant force spring has been proposed to over come these known drawbacks. See for example U.S. Pat. No. 5,602,957. The constant force spring is a ribbon of spring material (usually spring steel) which is wound up at both ends like a clock spring with a straight or flat portion at the centre joining the two coils. The brush is placed in the cage with the centre of the spring pressing the outer end of the brush and the two coil portions engage the cage at or near the end of the cage adjacent the commutator. Unwound portions of the two coils extend along the sides of the brush within the cage while the ends are outside of the cage, usually by passing out through an opening adjacent the inner end of the cage so as to avoid contact between the spring and the commutator. In use, the coil portions of the spring try to coil up by withdrawing the rest of the spring from the cage, thus drawing the brush out of the cage by the resilient urgings of the coil portions. The force applied by the spring to the brush is substantially constant from maximum extent to almost relaxed, hence the name constant force spring. This type of spring allows for excellent brush length to cage length ratio meaning that the brush can utilise almost the entire length of the cage, giving a maximum brush length and thus brush life.

One drawback of the constant force spring is that at end of life of the brush and during assembly, there is nothing stopping the spring from being disconnected from the cage with the danger of causing a short circuit within the motor. This is not a problem for low voltage motors but for high voltage motors this is a potential safety issue due to the risk of potential electrical shocks and fire.

SUMMARY OF THE INVENTION

Hence there is a desire for a motor with a constant force spring brush cage assembly in which the spring can not disconnect from the cage when the brush is worn out. This desire is achieved by the present invention in which the cage has fingers which capture the constant force spring.

Additionally, the cage may have a stopper to reduce the possibility of a coil portion getting hung up on itself and extending or ballooning out with the danger of touching the commutator or other electrical components or connections within the motor.

Accordingly, in one aspect thereof, the present invention provides a cage brush assembly comprising: a brush for making sliding electrical contact with a commutator of the motor; a cage for guiding the brush along a path, the cage having a first end portion adapted to be located in use adjacent to the commutator and a second end portion remote from the commutator; a spring for resiliently urging the brush along the path through the cage, wherein the spring is a constant force spring formed from a ribbon of resiliently deformable material having a middle portion which is substantially flat and two end portions which are coiled, the middle portion contacting an end of the brush, the cage having two fingers about which the coiled end portions of the spring locate respectively, the two fingers being located at the first end portion of the cage.

According to a second aspect thereof, the present invention provides an electric motor comprising: a stator; a wound rotor, including a shaft, rotor windings and a commutator; and brush gear for connecting the commutator to a source of electrical power, the brush gear having at least two cage brush assemblies, each cage brush assembly comprising: a brush for making sliding electrical contact with the commutator; a cage for guiding the brush along a path, the cage having a first end portion adapted to be located in use adjacent to the commutator and a second end portion remote from the commutator; a spring for resiliently urging the brush along the path through the cage, wherein the spring is a constant force spring formed from a ribbon of resiliently deformable material having a middle portion which is substantially flat and two end portions which are coiled, the middle portion contacting an end of the brush, the cage having two fingers about which the coiled end portions of the spring locate respectively, the two fingers being located at the first end portion of the cage.

Preferably, the brush has an embedded shunt which is connected to the second end portion of the cage.

Preferably, the cage has two openings formed in the first end portion on opposite sides of the cage and the coiled end portions of the spring extend through the openings.

Preferably, each of the openings is formed by bending a flap out of the wall of the cage, each flap forming a seat for the coiled end portions of the spring.

Preferably, the fingers are an extension of the flaps.

Preferably, each flap has a ridge on an end remote from the cage.

Preferably, the ridge is formed by bending the end of the flap towards the end portion of the spring.

Preferably, the cage, including the flaps, ridges and fingers, is formed from a single piece of sheet metal.

BRIEF DESCRIPTION OF THE DRAWINGS

A preferred embodiment of the invention will now be described, by way of example only, with reference to the accompanying drawings, in which.

Figure 1:
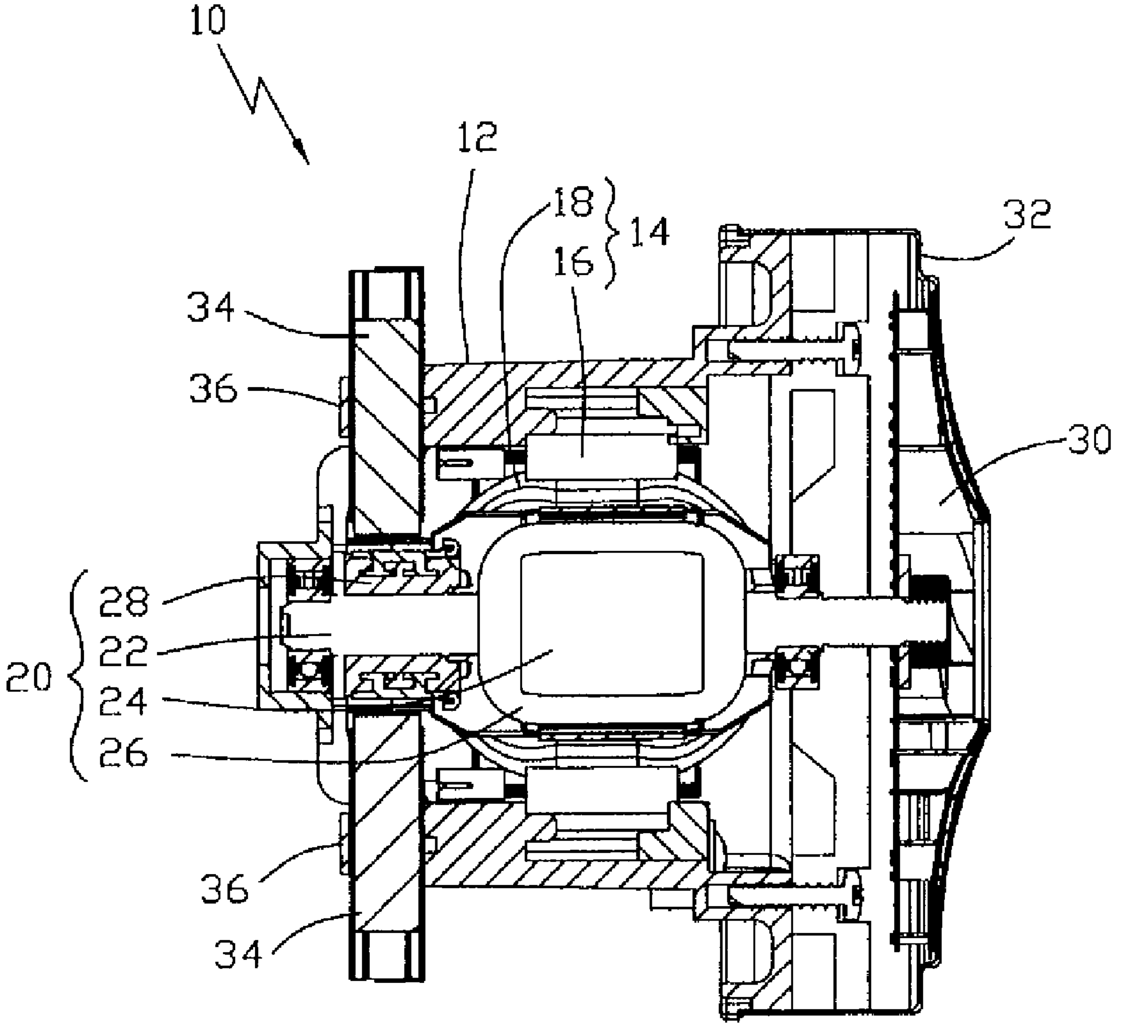
FIG. 1 is a partial sectional view of an electric motor according to a preferred embodiment of the present invention.
Figure 2:
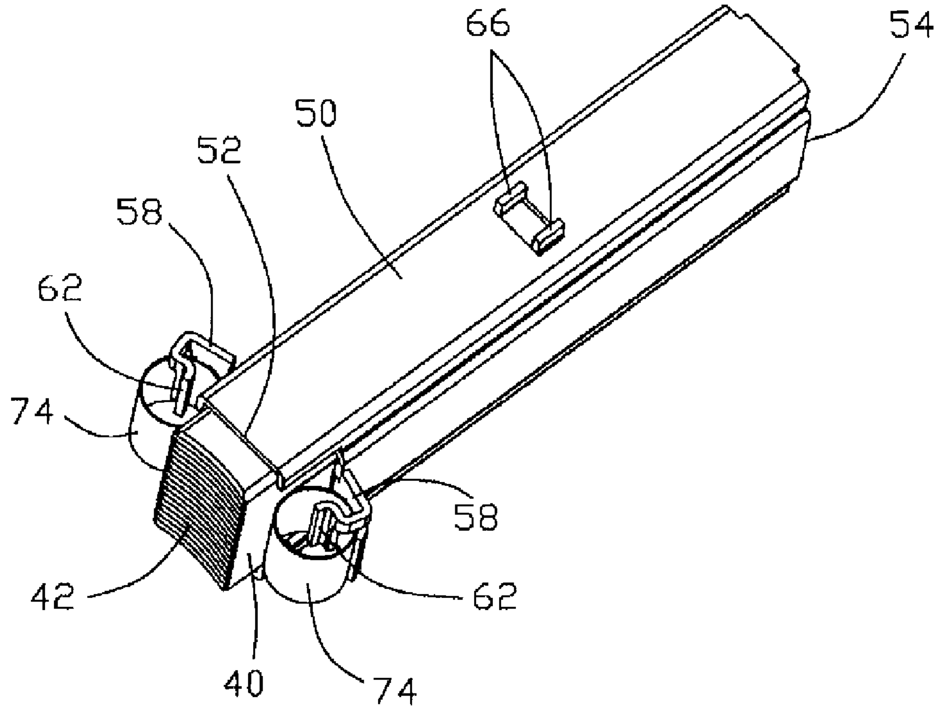
FIG. 2 is a schematic perspective view of brush cage assembly, being a part of the electric motor of FIG. 1.

In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale.

DETAILED DESCRIPTION OF THE PREFERRED EMBODIMENT

The present invention will now be described using a blower motor as an example. The motor 10, shown in FIG. 1 in partial section, is a universal motor having a housing 12 accommodating a wound stator 14 and a wound rotor 20. The rotor 20 has a motor shaft 22, a rotor core 24 about which rotor windings 26 are wound and a commutator 28 to which the windings 26 are terminated. A blower is fitted to one end of the motor and comprises an impeller 30 fixed to an end of the motor shaft 22 and arranged to rotate within a blower housing or volute 32 mounted to the end of the housing 12. The stator 14 has a two pole stator core 16 with stator windings 18 wound about the core 16. Brush gear in the form of two cage brush assemblies 34 connect the rotor windings 26 to a source of electrical power via the commutator 28. Universal motors may be series wound or shunt wound. In shunt wound, the stator windings and the rotor windings are connected in parallel and thus the brushes connect the commutator directly to the motor terminals. In a series wound motor the stator windings and the rotor windings are connected in series and thus one or both brushes are connected to the motor terminals via the stator windings.

Figure 4:
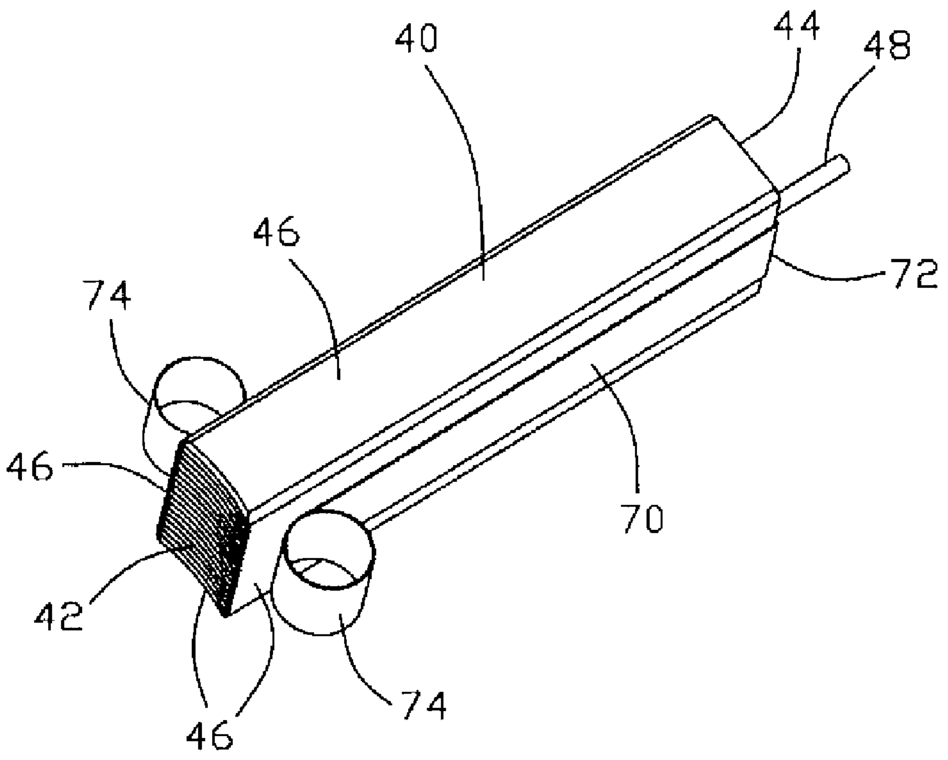
FIG. 4 is a perspective view of a brush and spring being a part of the brush cage assembly of FIG. 2.
Figure 5:
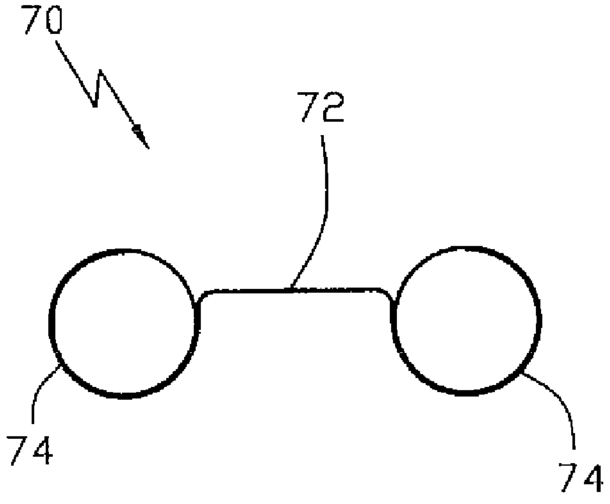
FIG. 5 is a plan view of the spring of FIG. 4, in a relaxed condition.

The cage brush assemblies 34 are preferably identical, and one will be described in detail. The cage brush assembly 34 has a brush 40, a cage 50 and a spring 70. The brush 40 is adapted to make sliding electrical contact with the commutator 28. The brush 40 has an elongate shape with a rectangular cross section, having first and second ends 42, 44 and four sides 46. The first end 42 is adapted to contact the commutator 28. The second end 44 has an embedded shunt 48. The cage 50 guides the brush 40 along a path to the commutator. The cage 50 is preferably a brass tube in which the brush is slidably received. The cage has a first end portion 52 adjacent the commutator and a second end portion 54 remote therefrom. The second end portion 54 may form a motor terminal or a terminal to which the stator winding and/or lead wires may be connected, in which case, the shunt 48 may be connected directly to the second end portion 54 of the cage. The spring 70 is a constant force spring. As shown in FIG. 5, the spring 70 is formed from a ribbon or strip of resiliently deformable material having a flat middle portion 72 and two end portions 74 which are coiled like a clock spring. The flat middle portion 72 contacts or engages the second end 44 of the brush 40 and the coiled end portions 74, in use, partially uncoil and extend along two opposite sides 46 of the brush 40 as illustrated in FIG. 4.

Figure 3:
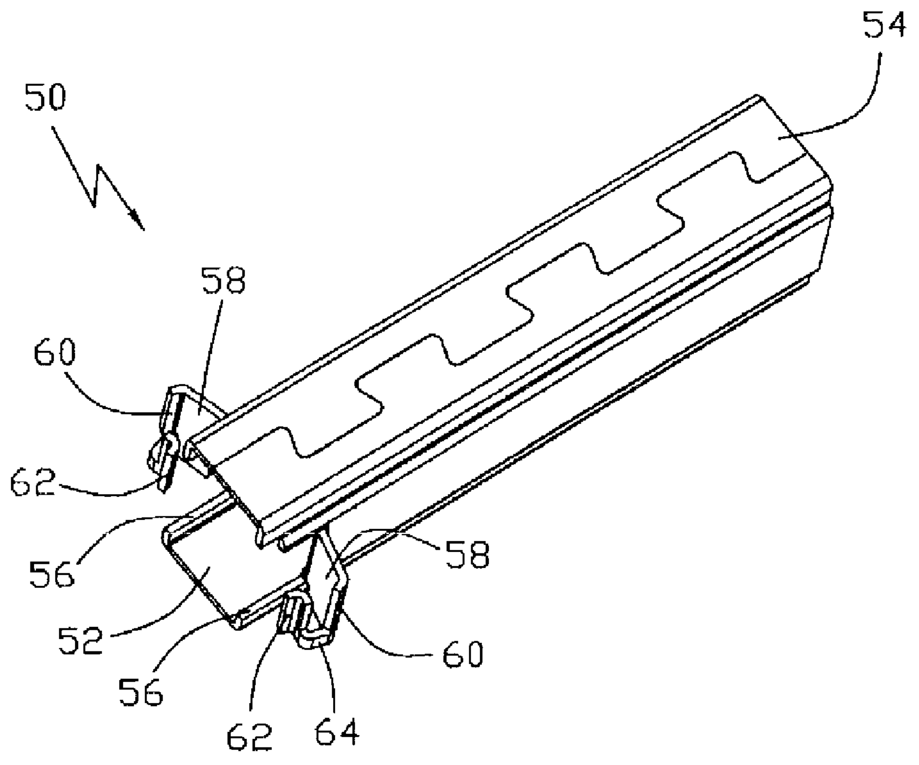
FIG. 3 is a perspective view from below of a cage being a part of the brush cage assembly of FIG. 2.

The cage 50, as shown in FIG. 3, has two openings 56 formed in two opposite sides adjacent the first end portion 52. The openings 56 are formed by cutting and bending out two flaps 58 which form seats for the coiled end portions 74 of the spring 70. In use, the brush 40 is urged out of the cage 50 as the unwound coiled end portions 74 of the spring resiliently try to return to the coiled up condition. The flaps 58 have a ridge 60 formed by bending a small strip along the free edge of the flap 58 towards the coiled end portion 74 of the spring. A finger 62 is also cut and bent out of the flap 58. The finger 62 is connected to the flap 58 by a short arm 64 and is arranged to extend across the flap 58 in a direction parallel to the side of the cage and perpendicular to the direction of the brush path so as to extend through a ring formed by the coiled end portion 74 of the spring 70.

The finger 62 provides a latch holding the spring 70 in place during assembly and at the end of life when the brush is worn out. During assembly the coiled ends of the spring are placed over the fingers 62 which hold the spring in place pending the insertion of the brush. Similarly, at end of life, the fingers prevent the spring from becoming dislodged from the cage. The ridge 60 is provided to reduce the tendency of the coiled end portions 74 of the spring to expand due to friction between the surfaces of the spring and/or between the surface of the spring and the surface of the flap 58. The end of the spring 70 may contact the finger 62 as the spring 70 is coiling up which may also result in the spring not sliding smoothly over itself and causing the coil to balloon out risking potential short circuit with other electrical parts. The ridge 64 applies a gentle force to the coil as it starts to balloon, sufficient to overcome the friction or catching of the coil preventing ballooning of the coils of the spring 70.

The cage also has two locator projections 66 raised from one side of the cage. The locator projections 66 mate with a recess in the housing to physically locate the cage with respect to the housing in the axial direction of the cage (radial direction of the motor) and setting the radial gap between the cage 50 and the commutator 28. A saddle clip 36 (see FIG. 1) clamps the cage 50 to the housing 12. The cage 50, including the flaps 58, ridges 60, aims 62 and fingers 64, is formed, preferably, by stamping and bending a metal sheet, preferably a brass sheet.

Thus it can be seen that preferred embodiments of this invention provide an improved brush assembly for and electric motors incorporating same which provides easier assembly and greater safety when the brushes are worn out.

In the description and claims of the present application, each of the verbs “comprise”, “include” and “have”, and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the illustrated motor is a universal motor, the brush assemblies could be used with other types of motors using cage brushes, such as permanent magnet DC motors.

The invention claimed is:

1. A cage brush assembly for an electric motor, comprising:

a brush for making sliding electrical contact with a commutator of the motor;

a cage for guiding the brush along a path, the cage having a first end portion adapted to be located in use adjacent to a commutator and a second end portion remote from the commutator;

a spring for resiliently urging the brush along the path through the cage, wherein the spring is a constant force spring formed from a ribbon of resiliently deformable material having a middle portion which is substantially flat and two end portions which are coiled, the middle portion contacting an end of the brush, the cage having two fingers encircled by the coiled end portions of the spring located respectively, the two fingers being located at the first end portion of the cage.

2. The assembly of claim 1, wherein the brush has an embedded shunt which is connected to the second end portion of the cage.

3. The assembly of claim 1, wherein the cage has two openings formed in the first end portion on opposite sides of the cage and the coiled end portions of the spring extend through the openings.

4. The assembly of claim 3, wherein each of the openings is formed by bending a flap out of the wall of the cage, each flap forming a seat for the coiled end portions of the spring.

5. The assembly of claim 4, wherein the fingers are formed as an extension of the flaps.

6. The assembly of claim 4, wherein each flap has a ridge on an end remote from the cage.

7. The assembly of claim 6, wherein the ridge is formed by bending the end of the flap towards the end portion of the spring.

8. An electric motor, comprising:

a stator;

a wound rotor, including a shaft, rotor windings and a commutator; and brush gear for connecting the commutator to a source of electrical power, the brush gear having at least two cage brush assemblies, each cage brush assembly comprising:

a brush for making sliding electrical contact with a commutator of the motor;

a cage for guiding the brush along a path, the cage having a first end portion adapted to be located in use adjacent to a commutator and a second end portion remote from the commutator;

a spring for resiliently urging the brush along the path through the cage, wherein the spring is a constant force spring formed from a ribbon of resiliently deformable material having a middle portion which is substantially flat and two end portions which are coiled, the middle portion contacting an end of the brush, the cage having two fingers encircled by the coiled end portions of the spring located respectively, the two fingers being located at the first end portion of the cage.

9. The motor of claim 8, wherein the brush has an embedded shunt which is connected to the second end portion of the cage.

10. The motor of claim 8, wherein the cage has two openings formed in the first end portion on opposite sides of the cage and the coiled end portions of the spring extend through the openings.

11. The motor of claim 10, wherein each of the openings is formed by bending a flap out of the wall of the cage, each flap forming a seat for the coiled end portions of the spring.

12. The motor of claim 11, wherein the fingers are an extension of the flaps.

13. The motor of claim 11, wherein each flap has a ridge on an end remote from the cage.

14. The motor of claim 13, wherein the ridge is formed by bending the end of the flap towards the end portion of the spring.

15. The motor of claim 13, wherein the cage, including the flaps, ridges and fingers, is formed from a single piece of sheet metal.

* * * * *